(12) United States Patent
Boisse

(10) Patent No.: US 11,816,781 B2
(45) Date of Patent: Nov. 14, 2023

(54) SPATIAL HASHING FOR WORLD-SPACE SPATIOTEMPORAL RESERVOIR RE-USE FOR RAY TRACING

(71) Applicant: ADVANCED MICRO DEVICES, INC., Santa Clara, CA (US)

(72) Inventor: Guillaume Marie Boisse, Paris (FR)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 17/354,906

(22) Filed: Jun. 22, 2021

(65) Prior Publication Data

US 2022/0406002 A1 Dec. 22, 2022

(51) Int. Cl.
*G06T 15/06* (2011.01)
*G06T 15/50* (2011.01)

(52) U.S. Cl.
CPC .............. *G06T 15/06* (2013.01); *G06T 15/50* (2013.01)

(58) Field of Classification Search
CPC ... G06T 15/06; G06T 15/506; G06T 2210/21; G06T 19/20; G06T 15/50; G06T 15/80
See application file for complete search history.

(56) References Cited

U.S. PATENT DOCUMENTS

| 7,567,248 B1* | 7/2009 | Mark | G06T 11/40 345/426 |
| 2022/0108497 A1* | 4/2022 | Panteleev | G06T 11/001 |

OTHER PUBLICATIONS

Nikolaus Binder et al., "Massively Parallel Path Space Filtering," arXiv: 1902.05942v2 [cs.GR]; Feb. 3, 2021, 20pgs.
Benedikt Bitterli et al., "Spatiotemporal Reservoir Resampling for a Real-Time Ray Tracing with Dynamic Direct Lighting," ACM Trans. Graph. vol. 39. No. 4, Article 148, Jul. 2020.
Binder et al. "Massively Parallel Path Space Filtering" arXiv:1902.05942v2, 2021, 20 pages.
Bitterli et al. "Spatiotemporal Reservoir Resampling for Real-Time Ray Tracing with Dynamic Direct Lighting," ACM Trans. Graph., vol. 39, No. 4, Article 148, 2020, 17 pages.

* cited by examiner

*Primary Examiner* — Hau H Nguyen

(57) ABSTRACT

A processor shares path tracing data across sampling locations to amortize computations across space and time. The processor maps a group of sampling locations of a frame that are adjacent to each other in world-space to a cell of a hash table. Each cell of the hash table stores a list of reservoirs that are each associated with a ray that intersects the group of sampling locations from world-space. The processor resamples the reservoirs at the hash table by combining and re-using reservoirs across neighboring sampling locations and corresponding sampling locations of the previous frame to select a set of samples mapped to the cell. The processor then performs resampling of the selected set of samples to obtain a representative light sample to determine a value for the cell and renders the frame based on the value of the cell.

24 Claims, 5 Drawing Sheets

SPATIAL HASHING FOR WORLD-SPACE SPATIOTEMPORAL RESERVOIR RE-USE FOR RAY TRACING

BACKGROUND

Virtual reality (VR) systems use interactive applications to simulate different types of environments. VR systems seek to provide a realistic visual experience to immerse users in these simulated environments and artificially create sensory experiences for the users. The visual experience is made more realistic by displaying what users expect to see, in real-time, throughout their experience. The realistic experience is facilitated by displaying the video data with high visual quality (e.g., high definition) and low latency (the amount of time for the data to traverse VR sub-systems and/or VR devices). When the visual quality is lacking or latency of the data increases, the realism of the visual experience may be negatively affected.

Ray tracing is a technique for generating an image by tracing the path of light as pixels in an image plane and simulating the effects of interactions between the light and virtual objects. By extension, path tracing is a technique for shooting multiple rays per pixel in random directions and can be used to solve more complex lighting situations. Path tracing relies on the use of Monte Carlo methods of solving a rendering equation. Path tracing produces images that are more realistic as a function of the number of light samples used per pixel, but as the number of light samples increases, so does the computational expense. In addition, real-time rendering of dynamic scenes constrains the amount of time to build and update data structures for light sampling.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
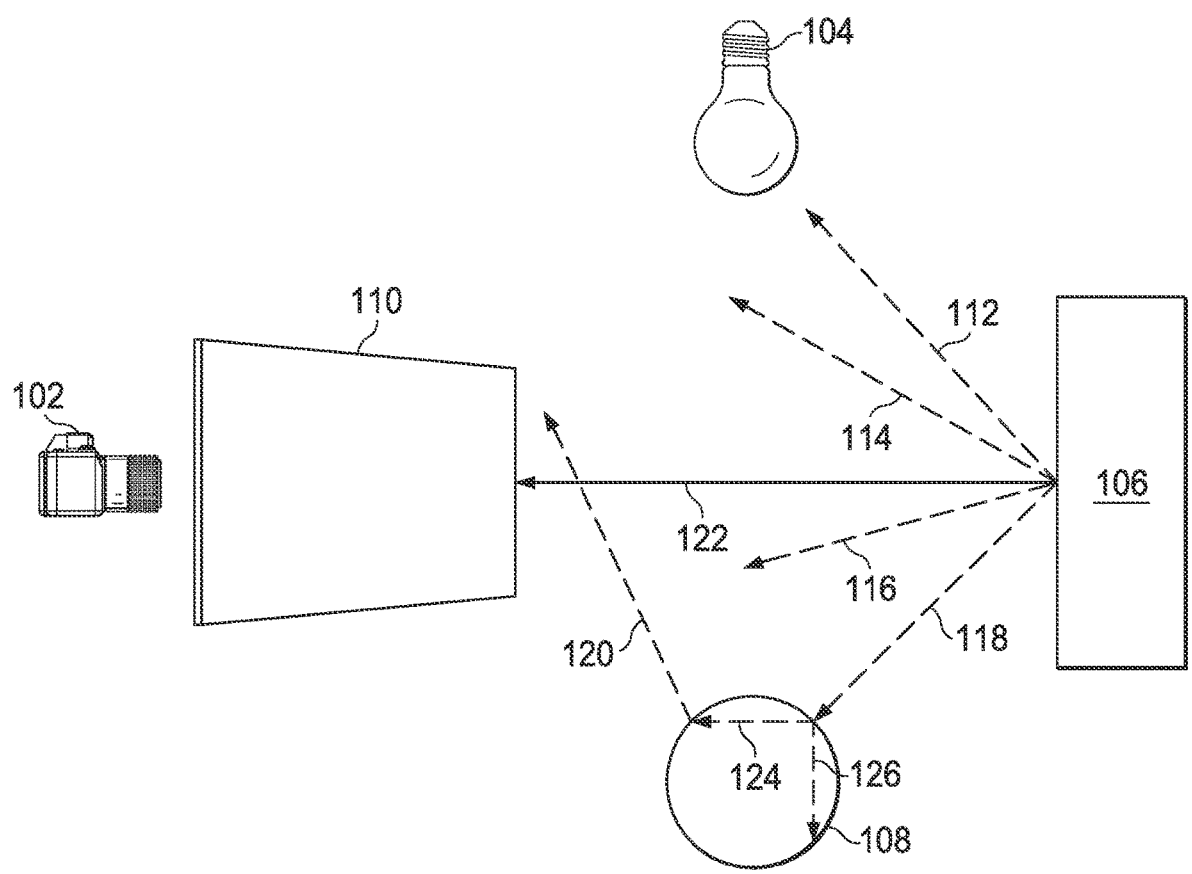
FIG. 1 is an illustration of a scene in world-space in which light is reflected off objects to a user's eye in accordance with some embodiments.

A processing system performs ray and path tracing by shooting rays from a camera toward a scene and intersecting the rays with the scene geometry to construct light paths. As objects are hit, the processing system generates new rays on the surfaces of the objects to continue the paths. The processing system computes color values for each of the rays and determines the values of pixels of an image for display based on the color values.

Monte Carlo path tracing is a technique for tracing paths of light through pixels on an image plane in which the color of a pixel is computed by randomly sampling light paths that connect the camera to light sources through multiple interactions with the scene. Averaging the intensities of many samples for a pixel produces a noisy estimate of the total illumination of the pixel. Whereas offline rendering used for applications such as movies uses thousands of shadow-casting light rays, or samples, per pixel, to perform real-time rendering, the processing system can trace only a few rays at each pixel due to time, power, and memory constraints. Therefore, the samples that are selected for each pixel impact the quality of the resulting image.

When a ray reaches a surface in a computer-generated scene, the ray can split into one or more additional rays, such as reflected, refracted, and shadow rays. For example, a ray reflected from a perfectly specular surface can be traced in a mirror-reflection direction from a point corresponding to where an incoming ray reaches the surface. The closest object that the reflected ray intersects can be what will be seen in the reflection. By contrast, a refracted ray can be traced in a different direction than the reflected ray, such as when a refracted ray goes into a surface. For another example, a shadow ray can be traced toward each light. If an opaque object is located between the surface and the light, the surface can be in shadow and the light may not illuminate the surface.

Rather than randomly determining which rays to use, a bidirectional reflectance distribution function (BRDF) can be used to determine how light is reflected off a surface. The BRDF is a probability distribution function that describes the probability that an incoming ray of light is scattered in a random outgoing direction. If a material is more diffuse and less specular, the BRDF will be wider, indicating more directions to sample. When more sampling directions are required, the computation cost for path tracing may increase.

In path tracing, the light leaving an object in a certain direction is computed by integrating all incoming and generated light at that point. The nature of this computation is recursive, and is governed by the rendering equation, which calculates the reflected radiance L by integrating all lighting contributions over a hemisphere $\Omega$:

$$L = \int_\Omega f(x)dx \text{ where } f(x) = \rho(x)L_e(x)V(x) \tag{1}$$

where $\rho$ represents the bidirectional reflectance distribution function (BRDF), $L_e$ represents emitted radiance, and V is a visibility function. The recursive integrals in the rendering equation can be evaluated using Monte Carlo importance sampling. Monte Carlo importance sampling (IS) estimates an integral by choosing N samples $x_i$ from a source probability density function (PDF) $p(x_i)$ and computing $$\langle L \rangle_{is}^N = \frac{1}{N} \sum_{i=1}^{N} \frac{f(x_i)}{p(x_i)} \approx L \tag{2}$$

which converges to the correct result as the sample count (N) increases.

The processing system uses resampled importance sampling (RIS) to sample approximately proportional to the product of some of the terms of the rendering equation by generating M≥1 candidate samples x={$x_i$, ..., $x_M$} from a source distribution that is suboptimal but easy to sample from, such as p∝$L_e$ and a target PDF such as $\hat{p}$∝ρ(x)$L_e$(x). Resampling is a method of repeat sampling from a given sample to estimate the precision of the sample by drawing randomly from a set of data points. RIS randomly chooses an index z∈{1, ..., M} from the pool of candidates, each having an associated resampling weight w($x_i$), using discrete probabilities:

$$p(z \mid x) = \frac{w(x_z)}{\sum_{k=1}^{M} w(x_i)} \text{ with } p(z \mid x) = \frac{w(x_z)}{\sum_{k=1}^{M} w(x_i)}. \quad (3)$$

A sample y≡$x_Z$ is then selected and used in the 1-sample RIS estimator:

$$\langle L \rangle_{ris}^{1,M} = \frac{f(y)}{\hat{p}(y)} \cdot \left(\frac{1}{M} \sum_{j=1}^{M} w(x_j)\right). \quad (4)$$

Repeating RIS multiple times and averaging the results yields an N-sample RIS estimator:

$$\langle L \rangle_{ris}^{N,M} = \frac{1}{N} \sum_{i=1}^{N} \left(\frac{f(y_i)}{\hat{p}(y_i)} \cdot \left(\frac{1}{M} \sum_{j=1}^{M} w(x_{ij})\right)\right). \quad (5)$$

Thus, resampled importance sampling generates M "low quality" samples from p into x={$x_i$, ..., $x_M$}, computes a normalized CDF for x using w=$\hat{p}$/p draws a random index z from x, and uses a sample y ≡$x_Z$ to calculate direct lighting. However, for higher quality results, M must be as large as possible, which adversely impacts the amount of computation and storage required. Further, in some applications RIS is limited to single bounce effects in screen-space (i.e., for objects within the viewing range of the frame) and does not reflect higher-order light bounces for global illumination in world-space, which includes objects outside the viewing range of the frame. For example, by looking for reservoirs for resampling in neighbor pixels and in a previous frame using per-pixel motion vectors, resampling can only be performed at the first bounce or for single-bounce effects only (i.e., direct lighting). By extending the search for reservoirs for resampling to world-space through spatial hashing and a GPU hash table structure, it is possible to find neighbor reservoirs in world-space rather than screen-space and to perform the resampling at any bounce along the path.

FIGS. 1-8 illustrate techniques for sharing path tracing data across sampling locations to amortize computations across space and time, leading to reduced variance (noise) while increasing computation efficiency and reducing the amount of stored data. A processor of a processing system renders a frame of a video stream using path tracing by mapping sampling locations of a frame of a video stream, storing one or more rays from world-space that intersect the mapped sampling locations, resampling the one or more rays to select a set of samples of points of the one or more rays that intersect the mapped sampling locations, and rendering the frame based on the selected set of samples. In some embodiments, the processor maps a group of adjacent ("neighboring") sampling locations of the frame to a cell of a hash table.

The neighboring sampling locations are adjacent in world-space but are not necessarily adjacent in screen-space. Each cell of the hash table stores a list of data structures referred to as "reservoirs" that are each associated with a ray that intersects the group of sampling locations from world-space. Each reservoir stores a currently selected light sample and resampling information such as a running sum of weights applied to each sample and other properties of the selected light sample. The processor resamples the reservoirs at the hash table by combining and re-using reservoirs across neighboring sampling locations and corresponding sampling locations of the previous frame to select a set of samples mapped to the cell. The processor then performs resampling of the selected set of samples to obtain a representative light sample to determine a value for the cell. In some applications such as irradiance caching, the processor averages the values of the selected set of samples to determine a value for the cell. For primary ray hits that go directly to the camera, each cell of the hash table maps to one or more pixels of a frame in screen-space, but for secondary bounces, neighboring sampling locations that map to a cell do not necessarily correspond to neighboring pixels. Mapping world-space sampling locations to a cell allows the processor to efficiently find neighbor reservoirs to perform resampling even though the sampling locations associated with the neighbor reservoirs are not necessarily nearby in screen-space.

In some embodiments, each cell of the hash table stores a flattened (i.e., non-linked) list of reservoirs, enabling random access to the elements of the list and thus random access to only a subset of the elements in the list rather than having to iterate through all them using stochastic selection. The flattened list of reservoirs therefore enables faster look-ups of reservoirs while also breaking up structured artifacts. By combining reservoirs of neighboring sampling locations at each cell of the hash table in a flattened list, the processor stochastically samples across reservoirs of neighboring sampling locations in a single lookup, leading to noise that does not exhibit structured artifacts and remains denoiser friendly. In some embodiments, the processor generates initial reservoirs for each sampling location and stores the initial reservoirs at the hash table using spatial hashing, as described in more detail below. The processor then performs separate passes of resampling to improve the light sample selection for each sampling location, both spatially—by looking for neighbors in the hash table of the current frame—and temporally—by looking for neighbors in the hash table of the previous frame. In some embodiments, the processor performs multiple passes in a spatial domain, sampling the list of reservoirs in a cell, and then performs a pass sampling the list of reservoirs of the corresponding cell of the previous frame. The processor performs a random selection of a few reservoirs in the looked-up hash table cell for each sampling location. In some embodiments, the processor selects four or five reservoirs for each sampling location. The processor then performs resampling by looking at each selected reservoir one by one and randomly determining whether to select a light sample from the reservoir based on the weight of the reservoir or use the previously selected light sample. The succession of random decisions results in a better light sample and therefore less noise in the final image with much fewer rays. The processor then denoises the frame and renders the frame for display.

FIG. 1 illustrates a scene 100 in world-space in which light is reflected off objects 106, 108 through a frame 110 of pixels to a camera 102 in accordance with some embodiments. Path tracing simulates light transport by tracing rays that connect the surfaces of light sources and a camera sensor, represented as the camera 102 in FIG. 1, through a three-dimensional scene 100. The scene 100 is represented by surfaces of objects 106, 108 and the scattering properties of the objects 106, 108. When a light ray interacts with the objects 106, 108, a new segment of the path is generated. The point of intersection of a light ray with the surface of an object 106, 108 is a world-space sampling location. By performing spatial hashing and a reservoir search at the sampling location, a processor obtains an improved light sample to calculate lighting at the world-space sampling location. Direct lighting occurs when a primary ray intersects the sampling location, and indirect lighting occurs after the first bounce (e.g., via reflections if the first bouse is specular or global illumination if the first bounce is diffuse). Although photons travel from emissive surfaces, for path tracing, paths are generated starting from the camera 102 and bounce off objects 106, 108 in the scene 100 until they encounter a light source 104. Because optical systems are reversible, tracing the paths from the camera 102 until they reach the light source 104 produces the same results as if paths were generated starting from the light source 104 until they reach the camera 102.

In the illustrated example, a ray 122 is projected from the camera 102 through the frame 110 into the scene 100, where the ray 122 encounters the object 106. The object 106 is partially reflective, and new segments 112, 114, 116, 118 scatter from the object 106 back into the scene 100. New segments 112, 114, 116, 118 represent only a subset of the infinite light rays that are reflected off the object 106, but given limitations on computational power, time, and memory, segments 112, 114, 116, 118, may be used as samples of the light rays that are reflected off the object 106. Segment 118 is reflected off the object 106 toward the object 108, which represents a glass sphere, which generates reflection and internal refraction rays (not shown), one of which travels through the object 108 to spawn more refraction rays, including ray 120.

The value the processor uses to render each pixel of the frame 110 is based on the rays of light intersecting surfaces of objects 106, 108 in the scene 100 in world-space. The rays intersecting each sampling location can come from an infinite number of directions; if a ray spawned from a position on the surface of an object 106, 108 reaches a light, the position is lit, and otherwise the position is not lit. To simplify the calculation of the value of each sampling location, the processor takes samples over the domain of the region of space from which light can be gathered using Monte Carlo sampling. Thus, to account for the fact that light at a sampling location point P (not shown) can come from anywhere in a hemisphere between a light source and the point P, the processor selects random samples (directions) within the hemisphere oriented around the point P and traces rays in these random directions into the scene 100. The Monte Carlo sampling generates more accurate results as the number of samples increases, but as the number of samples and the number of bounces increases, the calculations become exponentially more resource intensive.

Figure 2:
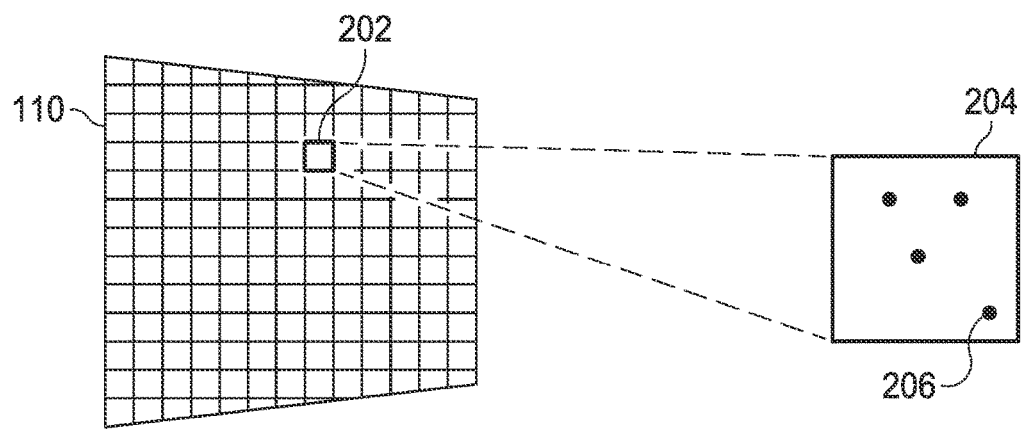
FIG. 2 is a diagram of a set of sampling locations of a frame mapped to a cell containing samples for path tracing in accordance with some embodiments.

To facilitate highly accurate path tracing using fewer samples per pixel, a processor shares sample information across neighboring (adjacent) sampling locations and reuses the samples for RIS. FIG. 2 is a diagram of a set 202 of sampling locations 202 of the frame 110 mapped to a cell 204 of a hash table (not shown) containing samples (e.g., sample 206) for path tracing in accordance with some embodiments. The processor groups adjacent ("neighboring") sampling locations into sets and assigns the groups of sampling locations to cells of the hash table. The number of sampling locations in the set 202 is a matter of design choice and varies from one embodiment to another.

Figure 3:
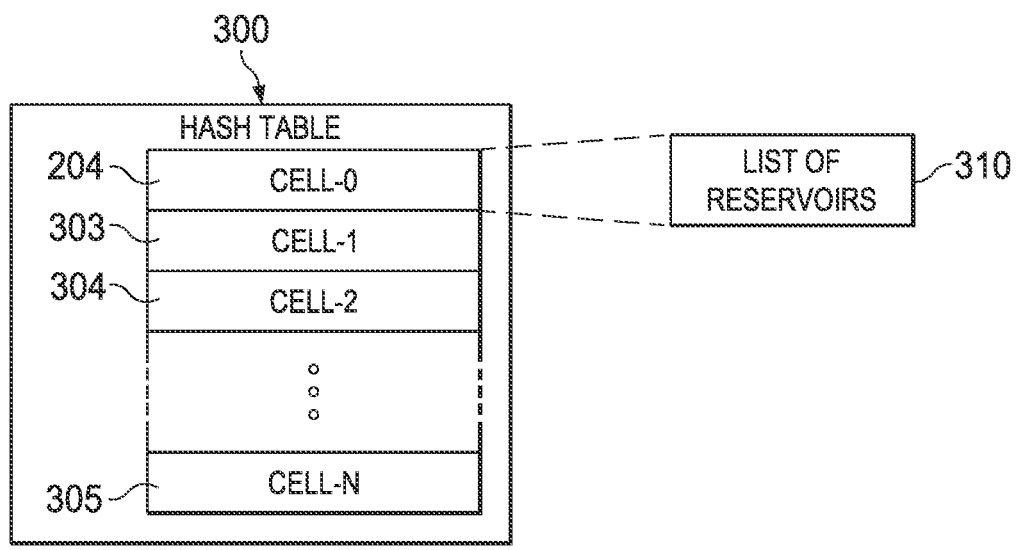
FIG. 3 is a block diagram of a hash table including cells containing lists of reservoirs of samples of neighboring sampling locations in accordance with some embodiments.

FIG. 3 is a block diagram of a hash table 300 including cells containing lists of reservoirs of samples of neighboring sampling locations in accordance with some embodiments. The hash table 300 stores a list of reservoirs for neighboring sampling locations in a single cell to enable stochastic reservoir selection for rays that intersect neighboring sampling locations of a given cell. By storing reservoirs for neighboring sampling locations in one cell, the processor performs resampling by accessing all reservoirs of the spatial region defined by the cell in a single look-up to the hash table. Thus, in the illustrated example, the hash table 300 includes cell-0 302, cell-1 303, cell-2 304, . . . , cell-N 305. Cell-0 302 stores a flattened list of reservoirs 310 for the sampling locations assigned to cell-0 302.

Figure 4:
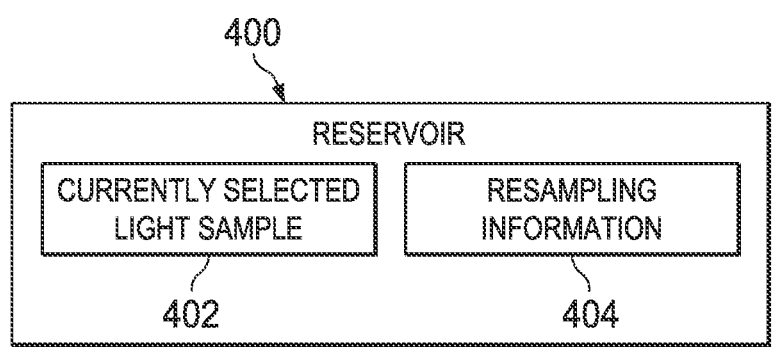
FIG. 4 is a block diagram of a reservoir in accordance with some embodiments.

FIG. 4 is a block diagram of a reservoir 400 in accordance with some embodiments. The reservoir 400 includes a currently selected light sample 402 and resampling information 404 such as a running sum $w_{sum}$ of resampling weights of all of the samples and the current state of resampling. In some embodiments, the reservoir 400 is relatively small, containing only a small number of bytes. The processor generates samples and sample weights for each sampling location and performs a second resampling pass to reuse computations performed at neighboring sampling locations by combining each sampling location's samples with the neighboring sampling locations' samples. The processor combines the neighboring sampling locations' samples by treating each reservoir's sample 402 as a new sample with weight $w_{sum}$ and feeding it as an input to a new reservoir.

Figure 5:
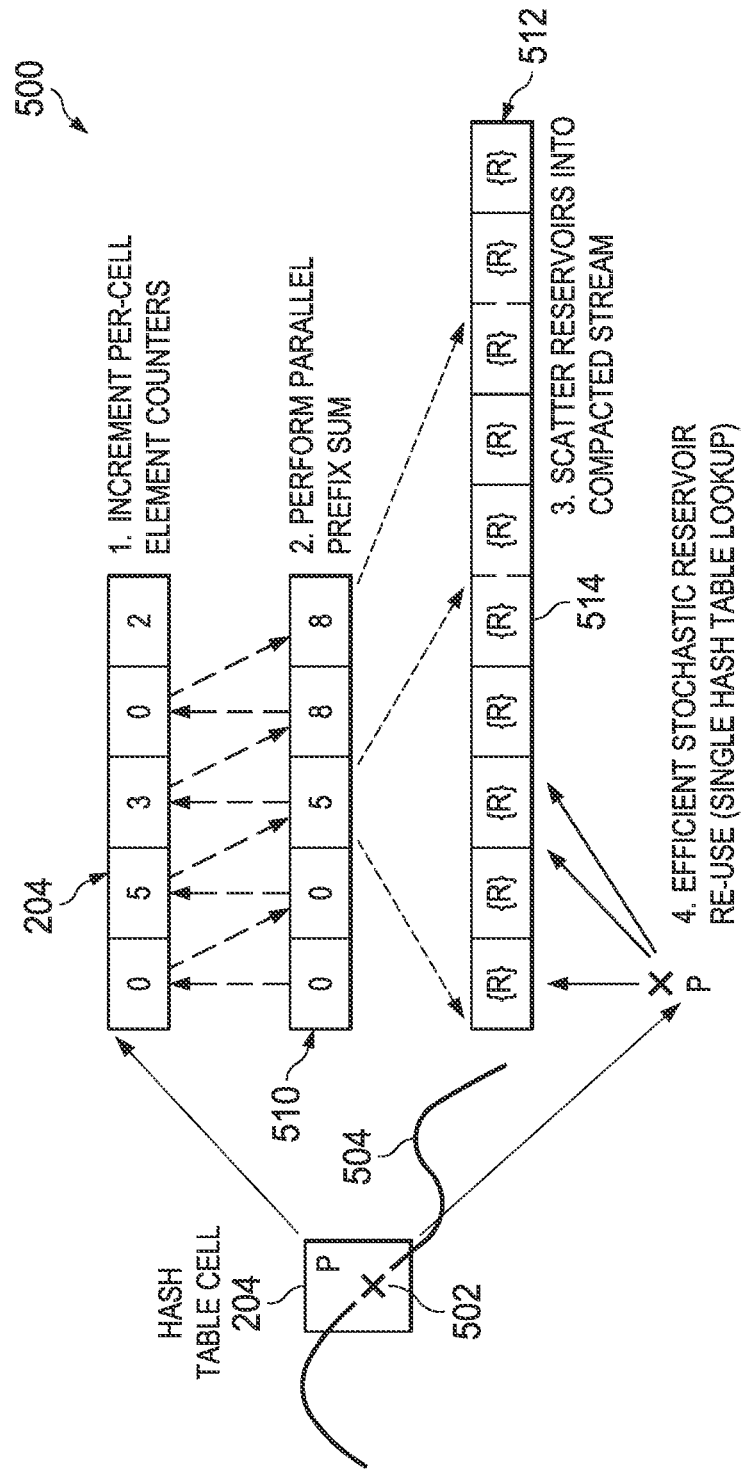
FIG. 5 is an illustration of a hash table look-up of a list of reservoirs of neighboring sampling locations for re-use resampling in accordance with some embodiments.

FIG. 5 is an illustration of a hash table look up 500 of a list of reservoirs of neighboring sampling locations for re-use sampling in accordance with some embodiments. The processor evaluates lighting at a sampling location point P 502 (referred to as "point P 502") where a ray intersects a surface 504. The processor hashes the coordinates of the point P 502 to determine the hash table cell 204 with which the point P 502 (referred to as the index of the hash table cell 204) is associated. In some instances, two distinct points in world-space yield the same hash value and therefore the same hash table cell. The processor handles such conflicts in some embodiments through linear search, also known as linear probing. In some embodiments, in order to not store and compare the full three-dimensional coordinates for each entry, the processor performs a secondary hash, also referred to as a checksum, and only stores and compares 32-bit values throughout the search. In most instances, distinct points in world-space will not yield the same primary hash function (used to retrieve the cell index) and secondary hash function (used to calculate the checksums).

The processor indicates that the point P 502 is associated with the hash table cell 204 by incrementing a counter (not shown) to indicate that a new element is being added to the hash table cell 204. In some embodiments, the processor keeps a running sum of the number of elements in the cell by performing a parallel prefix sum 510. The parallel prefix sum 510 allocates the storage for each list of reservoirs 310 within the cells (e.g., cell-0 204) of the hash table 300 so the scatter can write them. The hash table 300 can then be read from and used for reservoir resampling.

Each cell contains reservoirs (e.g., reservoir R 514) associated with samples of light rays that intersect sampling locations associated with the cell. Each light ray sample that intersects a sampling location associated with a cell writes out its reservoir into the cell, such that the reservoirs for neighboring sampling locations are scattered into a compacted stream 512 in a single hash table cell 204.

The processor then performs stochastic reservoir re-use in resampling using a single hash table lookup for neighboring sampling locations such that outputs of a prior re-use pass are used as an input. For k neighboring pixels and M samples per pixel, performing n iterations requires O(nk+M) computations, but yields $k^nM$ samples per pixel. Thus, each iteration requires an amount of additional computation that is practical for real-time applications and results in significantly improved image quality.

In some embodiments, the processor uses the immediately preceding frame in a stream of video frames for additional samples for temporal re-use. After rendering a frame, the processor stores each sampling location's final reservoir for re-use in the next frame. By rendering frames sequentially and storing the final reservoirs for reuse in the next frame, each frame combines reservoirs with all previous frames in a sequence, resulting in improved image quality and temporal stability.

Figure 6:
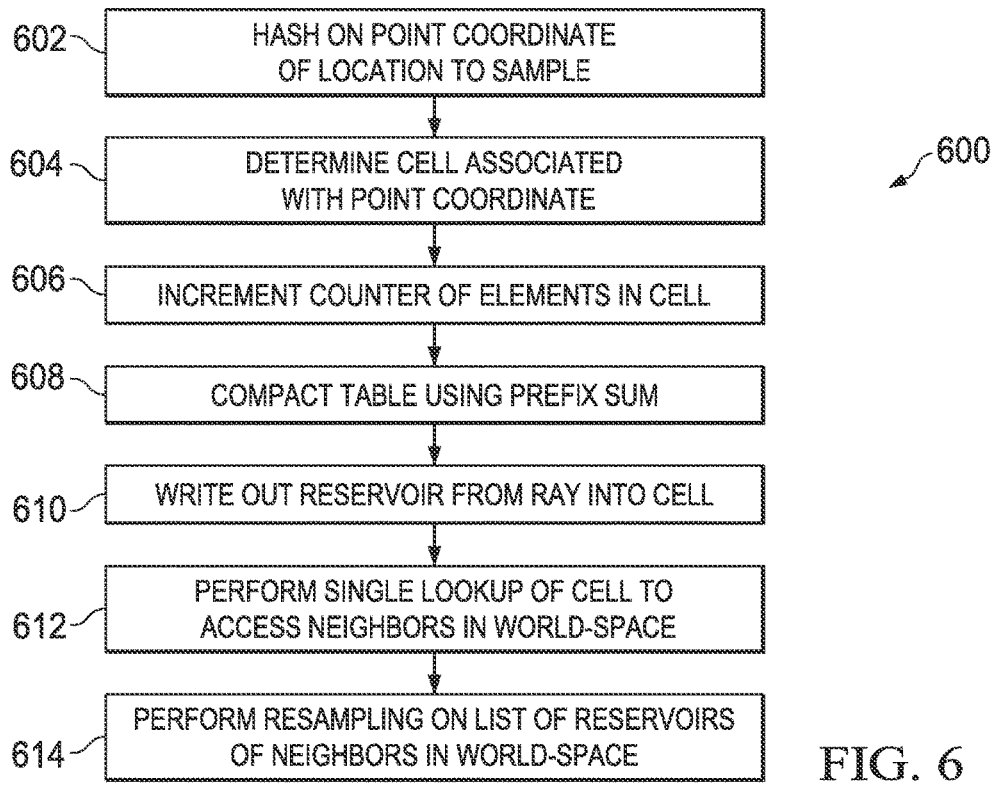
FIG. 6 is a flow diagram illustrating a method for performing spatial hashing for world-space spatiotemporal reservoir re-use for path tracing in accordance with some embodiments.

FIG. 6 is a flow diagram illustrating a method 600 for performing spatial hashing for world-space spatiotemporal reservoir re-use for path tracing in accordance with some embodiments. At block 602, the processor hashes on the point coordinate of the location to sample. At block 604, the processor determines which cell of the hash table 300 is associated with the coordinates of the point. At block 606, the processor increments a counter for the cell to indicate that a new element (i.e., the reservoir associated with the sample for the point P 502) is being added to the cell 204. At block 608, the processor compacts the hash table 300 using prefix sum to keep a running total of the number of elements (reservoirs) in the cell 204. At block 610, the processor writes out the reservoir for the light ray sample into the cell 204. At block 612, the processor performs a single lookup of the cell 204 to access reservoirs of neighboring sampling locations in world-space. At block 614, the processor performs resampling on the list of reservoirs of neighboring sampling locations in world-space to select samples to determine the value of the sampling locations associated with the cell 204.

Figure 7:
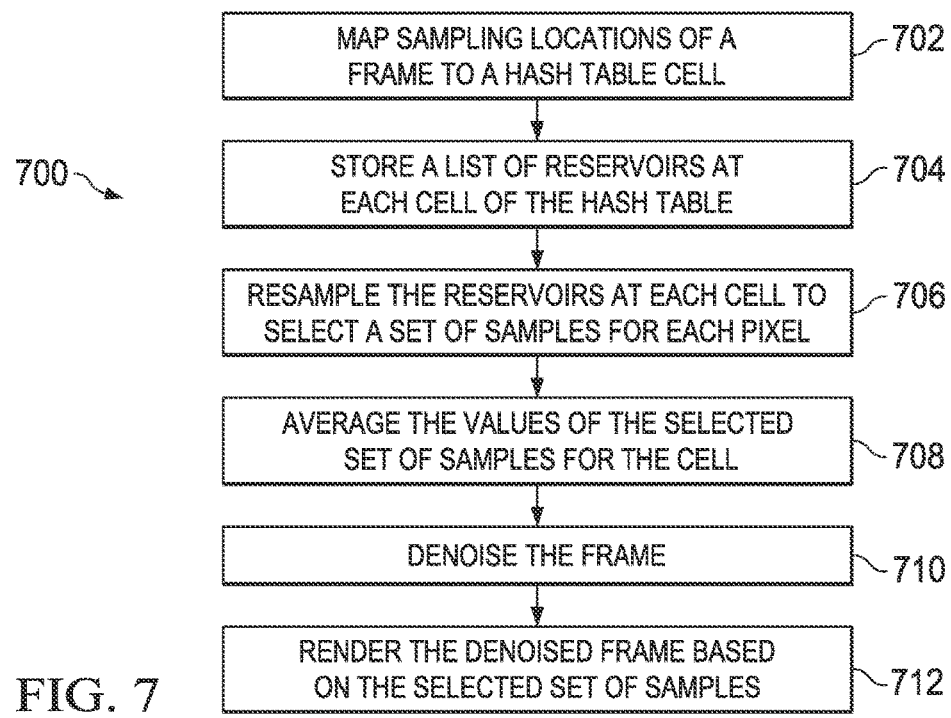
FIG. 7 is a flow diagram illustrating a method for rendering a denoised frame based on a selected set of samples in accordance with some embodiments.

FIG. 7 is a flow diagram illustrating a method 700 for rendering a denoised frame based on a selected set of samples in accordance with some embodiments. At block 702, the processor maps sets of sampling locations (e.g., set 202) of a frame 110 to a hash table cell 204. At block 704, the processor stores a list of reservoirs associated with samples of light rays intersecting sampling locations of the set 202 at each cell 204, 303, 304, 305 of the hash table 300. At block 706, the processor resamples the reservoirs at each cell to select a set of samples for each sampling location mapped to the cell 204. In some embodiments, the processor performs multiple spatial passes of resampling and one or more temporal passes or resampling using corresponding cells of a prior frame. At block 708, in some embodiments, the processor averages the values of the selected set of samples for the cell 204. At block 710, the processor denoises the frame 110. In some embodiments, to denoise the frame 110, the processor performs a temporal pass, re-using the per-pixel values from the previous frame and re-projecting them into the frame 110. The processor also estimates the variance (i.e., amount of noise) in the image. The processor performs multiple blur passes in which the intensity of the blur is modulated based on the estimated variance, so that areas with little noise are blurred less and details are preserved, and areas with high amounts of noise are blurred more aggressively. At block 712, the processor renders the denoised frame for display based on the selected set of samples.

Figure 8:
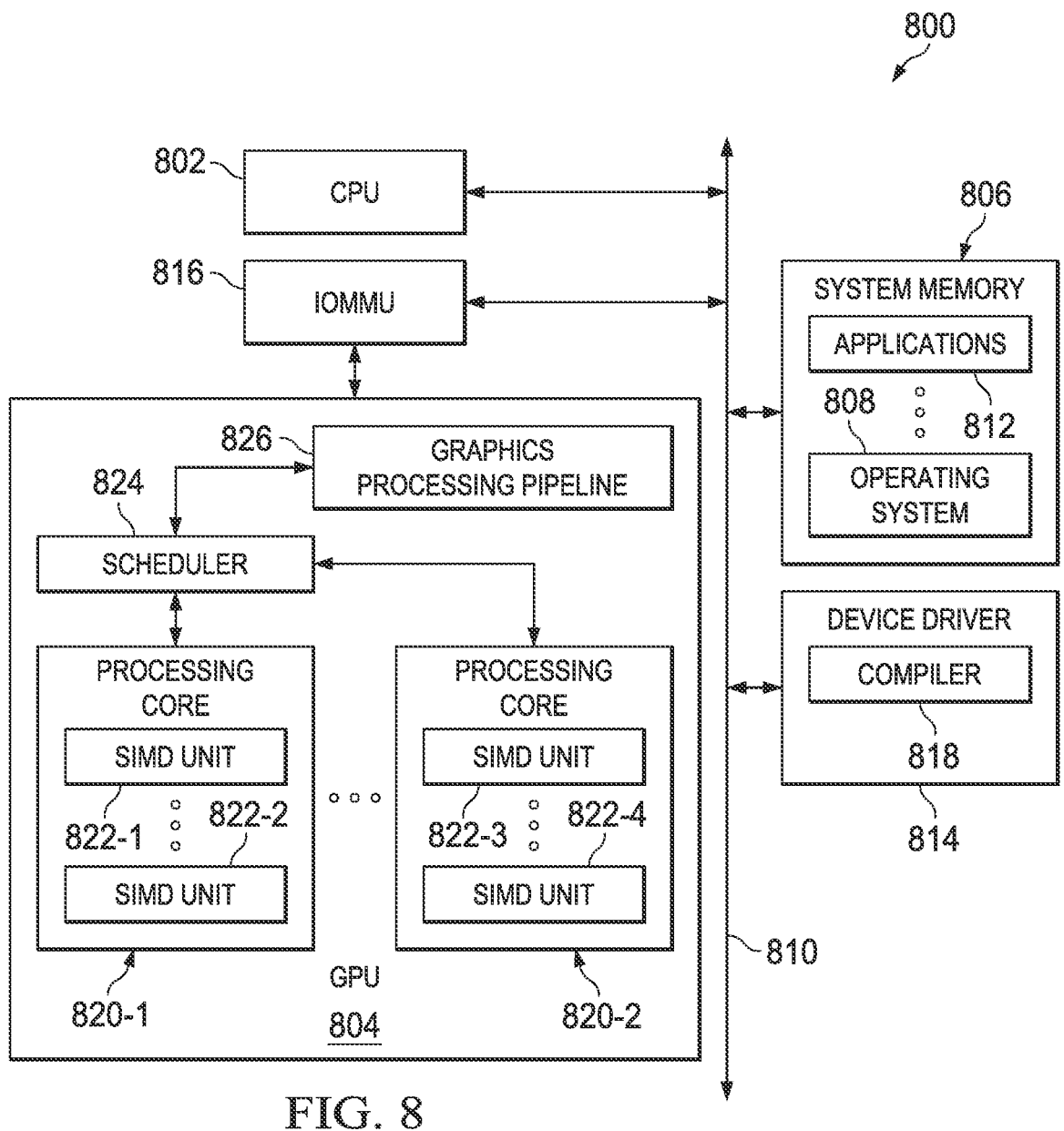
FIG. 8 is a block diagram of a processing system for performing spatial hashing for world-space spatiotemporal reservoir re-use for path tracing in accordance with some embodiments.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). Referring now to FIG. 8, a block diagram of a processing system 800 is illustrated in accordance with some embodiments, configured with parallel processors. The processing system 800 includes a central processing unit (CPU) 802 and a graphics processing unit (GPU) 804. In at least some embodiment, the CPU 802, the GPU 804, or both the CPU 802 and GPU 804 are configured to implement spatial hashing for world-space spatiotemporal reservoir re-use. The CPU 802, in at least some embodiments, includes one or more single- or multi-core CPUs. In various embodiments, the GPU 804 includes any cooperating collection of hardware and or software that perform functions and computations associated with accelerating graphics processing tasks, data-parallel tasks, nested data-parallel tasks in an accelerated manner with respect to resources such as conventional CPUs, conventional graphics processing units (GPUs), and combinations thereof.

In the embodiment of FIG. 8, the CPU 802 and the GPU 804 are formed and combined on a single silicon die or package to provide a unified programming and execution environment. This environment enables the GPU 804 to be used as fluidly as the CPU 802 for some programming tasks. In other embodiments, the CPU 802 and the GPU 804 are formed separately and mounted on the same or different substrates. It should be appreciated that processing system 800, in at least some embodiments, includes more or fewer components than illustrated in FIG. 8. For example, the processing system 800, in at least some embodiments, additionally includes one or more input interfaces, non-volatile storage, one or more output interfaces, network interfaces, and one or more displays or display interfaces.

As illustrated in FIG. 8, the processing system 800 also includes a system memory 806, an operating system 808, a communications infrastructure 810, and one or more applications 812. Access to system memory 806 is managed by a memory controller (not shown) coupled to system memory 806. For example, requests from the CPU 802 or other devices for reading from or for writing to system memory 806 are managed by the memory controller. In some embodiments, the one or more applications 812 include various programs or commands to perform computations that are also executed at the CPU 1002. The CPU 802 sends selected commands for processing at the GPU 804. The operating system 808 and the communications infrastructure 810 are discussed in greater detail below. The processing system 800 further includes a device driver 814 and a memory management unit, such as an input/output memory management unit (IOMMU) 816. Components of processing system 800 are implemented as hardware, firmware, software, or any combination thereof. In some embodiments, the processing system 800 includes one or more software, hardware, and firmware components in addition to or different from those shown in FIG. 8.

Within the processing system 800, the system memory 806 includes non-persistent memory, such as DRAM (not shown). In various embodiments, the system memory 806 stores processing logic instructions, constant values, variable values during execution of portions of applications or other processing logic, or other desired information. For example, in various embodiments, parts of control logic to perform one or more operations on CPU 802 reside within system memory 806 during execution of the respective portions of the operation by CPU 802. During execution, respective applications, operating system functions, processing logic commands, and system software reside in system memory 806. Control logic commands that are fundamental to operating system 808 generally reside in system memory 806 during execution. In some embodiments, other software commands (e.g., a set of instructions or commands used to implement a device driver 814) also reside in system memory 806 during execution of processing system 800.

The IOMMU 816 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 816 includes logic to perform virtual to physical address translation for memory page access for devices, such as the GPU 804. In some embodiments, the IOMMU 816 also includes, or has access to, a translation lookaside buffer (TLB) (not shown). The TLB is implemented in a content addressable memory (CAM) to accelerate translation of logical (i.e., virtual) memory addresses to physical memory addresses for requests made by the GPU 804 for data in system memory 806.

In various embodiments, the communications infrastructure 810 interconnects the components of the processing system 800. Communications infrastructure 810 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 810 also includes an Ethernet network or any other suitable physical communications infrastructure that satisfies an application's data transfer rate requirements. Communications infrastructure 810 also includes the functionality to interconnect components, including components of the processing system 1000.

A driver, such as device driver 814, communicates with a device (e.g., GPU 804) through an interconnect or the communications infrastructure 810. When a calling program invokes a routine in the device driver 814, the device driver 814 issues commands to the device. Once the device sends data back to the device driver 814, the device driver 814 invokes routines in an original calling program. In general, device drivers are hardware-dependent and operating-system-specific to provide interrupt handling required for any necessary asynchronous time-dependent hardware interface. In some embodiments, a compiler 818 is embedded within device driver 814. The compiler 818 compiles source code into program instructions as needed for execution by the processing system 800. During such compilation, the compiler 818 applies transforms to program instructions at various phases of compilation. In other embodiments, the compiler 818 is a standalone application. In various embodiments, the device driver 814 controls operation of the GPU 804 by, for example, providing an application programming interface (API) to software (e.g., applications 812) executing at the CPU 802 to access various functionality of the GPU 804.

The CPU 802 includes (not shown) one or more of a control processor, field-programmable gate array (FPGA), application-specific integrated circuit (ASIC), or digital signal processor (DSP). The CPU 802 executes at least a portion of the control logic that controls the operation of the processing system 800. For example, in various embodiments, the CPU 802 executes the operating system 808, the one or more applications 812, and the device driver 814. In some embodiments, the CPU 802 initiates and controls the execution of the one or more applications 812 by distributing the processing associated with one or more applications 812 across the CPU 802 and other processing resources, such as the GPU 804.

The GPU 804 executes commands and programs for selected functions, such as graphics operations and other operations that are particularly suited for parallel processing. In general, GPU 804 is frequently used for executing graphics pipeline operations, such as pixel operations, geometric computations, and rendering an image to a display. In some embodiments, GPU 804 also executes compute processing operations (e.g., those operations unrelated to graphics such as video operations, physics simulations, computational fluid dynamics, etc.), based on commands or instructions received from the CPU 802. For example, such commands include special instructions that are not typically defined in the instruction set architecture (ISA) of the GPU 804. In some embodiments, the GPU 804 receives an image geometry representing a graphics image, along with one or more commands or instructions for rendering and displaying the image. In various embodiments, the image geometry corresponds to a representation of a two-dimensional (2D) or three-dimensional (3D) computerized graphics image.

In various embodiments, the GPU 804 includes one or more compute units, such as one or more processing cores 820 (illustrated as 820-1 and 820-2) that include one or more single-instruction multiple-data (SIMD) units 822 (illustrated as 822-1 to 822-4) that are each configured to execute a thread concurrently with execution of other threads in a wavefront by other SIMD units 822, e.g., according to a SIMD execution model. The SIMD execution model is one in which multiple processing elements share a single program control flow unit and program counter and thus execute the same program but are able to execute that program with different data. The processing cores 820 are also referred to as shader cores or streaming multi-processors (SMXs). The number of processing cores 820 implemented in the GPU 804 is configurable. Each processing core 820 includes one or more processing elements such as scalar and or vector floating-point units, arithmetic and logic units (ALUs), and the like. In various embodiments, the processing cores 820 also include special-purpose processing units (not shown), such as inverse-square root units and sine/cosine units.

Each of the one or more processing cores 820 executes a respective instantiation of a particular work item to process incoming data, where the basic unit of execution in the one or more processing cores 820 is a work item (e.g., a thread). Each work item represents a single instantiation of, for example, a collection of parallel executions of a kernel invoked on a device by a command that is to be executed in parallel. A work item executes at one or more processing elements as part of a workgroup executing at a processing core 820.

The GPU 804 issues and executes work-items, such as groups of threads executed simultaneously as a "wavefront", on a single SIMD unit 822. Wavefronts, in at least some embodiments, are interchangeably referred to as warps, vectors, or threads. In some embodiments, wavefronts include instances of parallel execution of a shader program, where each wavefront includes multiple work items that execute simultaneously on a single SIMD unit 822 in line with the SIMD paradigm (e.g., one instruction control unit executing the same stream of instructions with multiple data). A scheduler 824 is configured to perform operations related to scheduling various wavefronts on different processing cores 820 and SIMD units 822 and performing other operations to orchestrate various tasks on the GPU 804.

To reduce latency associated with off-chip memory access, various GPU architectures include a memory cache hierarchy (not shown) including, for example, L1 cache and a local data share (LDS). The LDS is a high-speed, low-latency memory private to each processing core 820. In some embodiments, the LDS is a full gather/scatter model so that a workgroup writes anywhere in an allocated space. In some embodiments, the memory cache hierarchy stores the hash table 300.

The parallelism afforded by the one or more processing cores 820 is suitable for graphics-related operations such as pixel value calculations, vertex transformations, tessellation, geometry shading operations, and other graphics operations. A graphics processing pipeline 826 accepts graphics processing commands from the CPU 802 and thus provides computation tasks to the one or more processing cores 820 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD units 822 in the one or more processing cores 820 to process such data elements in parallel. As referred to herein, for example, a compute kernel is a function containing instructions declared in a program and executed on an accelerated processing device (APD) processing core 820. This function is also referred to as a kernel, a shader, a shader program, or a program.

In at least some embodiments, the processing system 800 is a computer, laptop/notebook, mobile device, gaming device, wearable computing device, server, or any of various other types of computing systems or devices. It is noted that the number of components of the processing system 800 varies from embodiment to embodiment. In at least some embodiments, there is more or fewer of each component/subcomponent than the number shown in FIG. 8. It is also noted that the processing system 800, in at least some embodiments, includes other components not shown in FIG. 8. Additionally, in other embodiments, the processing system 800 is structured in other ways than shown in FIG. 8.

In some embodiments, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
    mapping a plurality of sampling locations of a first frame of a video;
    identifying one or more rays from world-space that intersect the plurality of mapped sampling locations, wherein world-space includes objects outside a viewing range of the first frame;
    resampling the one or more rays to select a set of samples comprising points of the identified one or more rays intersecting the mapped sampling locations; and
    rendering the first frame based on the selected set of samples.

2. The method of claim 1, wherein mapping comprises mapping the plurality of sampling locations to a cell of a hash table.

3. The method of claim 2, wherein each ray is associated with a reservoir comprising information regarding one or more light sources.

4. The method of claim 3, wherein resampling comprises combining reservoirs across neighboring sampling locations and corresponding sampling locations of a second frame.

5. The method of claim 4, wherein resampling further comprises reusing reservoirs across the neighboring sampling locations and the corresponding sampling locations of the second frame.

6. The method of claim 3, wherein resampling comprises:
    performing a first pass of importance sampling to select a first set of samples from the reservoirs; and
    performing a second pass of importance sampling to select a second set of samples from the first set of samples.

7. The method of claim 6, further comprising: applying sampling weights to each sample.

8. The method of claim 4, wherein the second frame immediately precedes the first frame in the video stream.

9. The method of claim 3, wherein the hash table comprises a plurality of cells, each cell storing a flattened list of reservoirs.

10. The method of claim 9, wherein resampling comprises performing stochastic reuse of samples from the flattened list of reservoirs.

11. A computer-implemented method comprising:
    storing a plurality of light sources having rays that intersect a set of sampling locations of a first frame of a video stream from world-space, wherein world-space includes objects outside a viewing range of the first frame; and
    resampling the light sources across neighboring sampling locations to select a set of samples comprising points of rays intersecting each sampling location; and
    rendering the first frame for display based on the set of samples.

12. The method of claim 11, wherein storing comprises maintaining a list of reservoirs, each reservoir comprising an index of the plurality of light sources having rays that intersect the set of sampling locations from world-space.

13. The method of claim 12, wherein storing further comprises maintaining the list of reservoirs at a cell of a hash table, wherein the cell is associated with the set of sampling locations.

14. The method of claim 13, wherein resampling comprises combining reservoirs across neighboring sampling locations and across corresponding sampling locations of a second frame.

15. The method of claim 14, wherein resampling further comprises re-using reservoirs across neighboring sampling locations and across corresponding sampling locations of the second frame.

16. The method of claim 14, wherein the second frame immediately precedes the first frame in the video stream.

17. The method of claim 11, wherein resampling comprises iteratively performing importance sampling and comparing results.

18. The method of claim 17, wherein resampling further comprises applying sampling weights to each light sample of each reservoir.

19. A device comprising:
    a memory to store a plurality of light sources having rays that intersect a set of sampling locations of a first frame of a video stream from world-space, wherein world-space includes objects outside a viewing range of the first frame; and
    a processor coupled to the memory, the processor to resample the light sources to select a set of samples comprising points of rays intersecting each sampling location.

20. The device of claim 19, wherein the memory is to store the plurality of light sources in a plurality of reservoirs, each reservoir comprising an index of the plurality of light sources having rays that intersect the set of sampling locations from world-space.

21. The device of claim 20, wherein the memory is further to maintain a list of the reservoirs at a cell of a hash table, wherein the cell is associated with the set of sampling locations.

22. The device of claim 21, wherein the processor is to resample the light sources by combining reservoirs across neighboring sampling locations and across corresponding sampling locations of a second frame.

23. The device of claim 22, wherein the processor is further to resample the light sources by re-using reservoirs across neighboring sampling locations and across corresponding sampling locations of the second frame.

24. The device of claim 22, wherein the second frame immediately precedes the first frame in the video stream.

* * * * *